CONTROLLED WAVE ENERGY GENERATOR

Filed Aug. 30, 1948

INVENTOR
EDWARD W. HEROLD
BY Harry Tunick
ATTORNEY

Patented Sept. 18, 1951

2,568,395

UNITED STATES PATENT OFFICE 2,568,395

CONTROLLED WAVE ENERGY GENERATOR

Edward W. Herold, Kingston, N. J., assignor to Radio Corporation of America, a corporation of Delaware Application August 30, 1948, Serial No. 46,915

5 Claims. (Cl. 250—36)

Figures 1, 2:
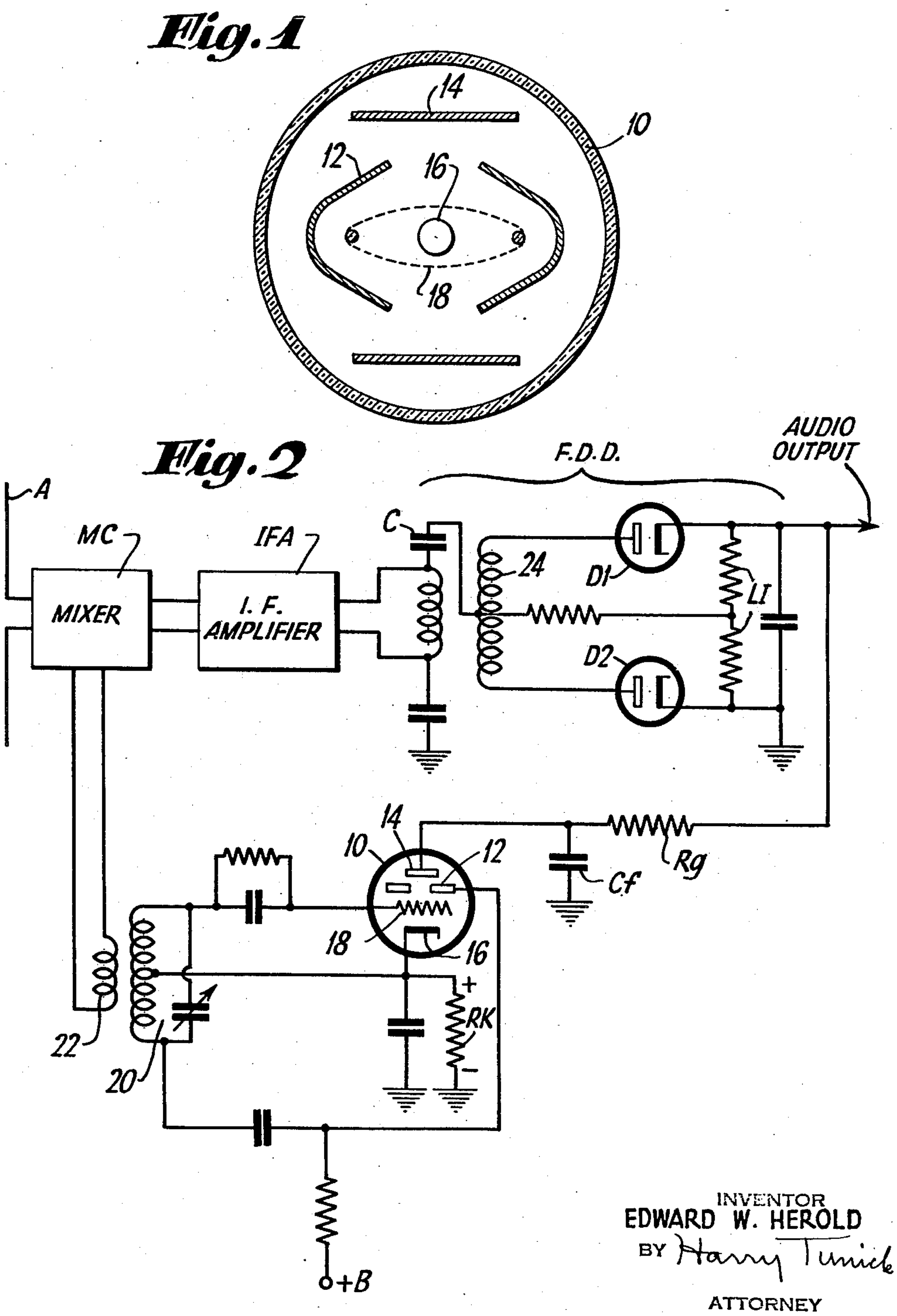

In this application, which is a continuation in part of my U. S. application Serial No. 752,009, filed June 3, 1947, now abandoned, I disclose a new and improved method of and means for generating wave energy and for controlling the frequency of the generated wave energy by controlling the effective tuning of a circuit wherein the wave energy appears or is developed.

Frequency controlling arrangements of various types are known in the art and I make no broad claim to the same as such. For example, Crosby, in his U. S. Patent No. 2,279,659, dated April 14, 1942, has disclosed systems including a tuned circuit wherein oscillatory energy appears of a frequency or phase determined by the circuit tuning. The circuit includes as a tuning reactance the complex impedance between two electrodes of a tube that includes an electron receiving electrode and an electron flow control electrode to which voltages of the oscillatory energy frequency are applied in about phase quadrature relation. A discriminator and detector responds to oscillatory energy frequency drifts or changes to provide a potential the magnitude of which changes in a corresponding manner and this potential is used to control the admittance of the tube to control its reactive effect in the circuit wherein the oscillatory energy flows and in a sense to counteract the said drift or change in frequency. These tubes so controlled are tube reactances and have become known as reactance tubes.

These known systems are very useful in many applications but become less effective as the frequency of the oscillatory energy to which the circuit is tuned goes up. This is because the interelectrode capacity and transit times are large enough to interfere with the phase shifting circuits supplying the quadrature voltage and the reactance tube plate resistance presents a serious load across the tuned circuit. In practice, this load may be sufficient to stop operation when the tuned circuit is in an oscillation generator. Moreover these known systems require considerable added apparatus including an additional tube or tubes and add materially to the cost of the equipment wherein the apparatus is to be used. This is permissible in some cases but cannot be tolerated in other cases. For example, in broadcast receivers of the heterodyne type addition of the extra equipment necessary in an automatic frequency control system of the known type adds unduly to the total cost of the receiver.

The need of frequency stabilization by control increases with frequency since a small percentage oscillator drift results in a considerable frequency change. For example, if the oscillator is to be used as a converter in a frequency modulation system, a drift of .01% causes a detuning of 10 kc. in the 100 mc. band. Oscillator drift thus is least harmful at the lower frequencies and is hardest to control at the higher frequencies where the reactances within the oscillator tube form a greater part of the tuned circuit controlling the frequency of operation.

A primary object of my invention is to provide an improved method of and means for controlling the frequency or phase of operation of tuned circuits operating in the very high frequency range. This object is attained by making use of reactance changes between the electrodes of a tube where the transit time of electrons passing from one electrode or its field to another electrode or its field is of the order of the period of the circuits involved. In these tubes if the transit time is changed the magnitude of the reactance changes. In accordance with my invention, a novel tube is provided which serves two functions and includes oscillator electrodes in a novel oscillation generator circuit and a reflector electrode with electrodes and connections so arranged that electron transit time in the tube is controlled to control the frequency of the oscillations generated. The transit time control may be in accordance with a potential which itself is varied in accordance with changes in the frequency of the oscillations being generated.

A further object of my invention is to provide a very low cost oscillation generator and oscillator frequency control apparatus such as might be used in receivers of the heterodyne type operating at frequencies of the order of 100 megacycles or higher.

These objects are attained in accordance with my invention by use of apparatus including said novel tube having oscillation generating electrodes in an oscillation generating circuit with a control potential applied to said reflector electrode to control electron transit time in the tube and make use of the resulting change of phase of the transconductance between electrodes in the oscillation generator to control the frequency of the oscillations generated. Thus the single tube fulfils both the functions of an oscillation generator and a reactance tube.

In the detailed description which follows use of my invention in a superheterodyne receiver for frequency modulated signals in the higher frequency bands is described. It will be understood that my invention is not limited to such use but on the contrary is of wide application in the radio and associated arts. Reference is also made to the drawings wherein in Figure 1 I show by electron discharge device symbols an electron discharge device arranged in accordance with my invention and in Figure 2 I show use of my tube of Figure 1 as an oscillation generator for a superheterodyne receiver with means for automatically controlling the frequency of the generated oscillations to improve the signal reception.

The advantages of automatic-frequency control in superheterodyne receivers are well known but such circuits have not been widely used because of their high cost. In a receiver for amplitude-modulated signals, an AFC system requires a discriminator, an amplifier, and a reactance tube across the oscillator circuit. In a frequency modulation receiver, however, the discriminator is already present so that, if the amplifier and reactance tube could be eliminated in an AFC system, there would be no increase in cost. It is a purpose of my invention to provide such a simple system by use of a transit-time effect in the local oscillator tube to vary the frequency of its oscillations in a manner controlled by the discriminator output voltage.

In an oscillating circuit using any ordinary tube at low frequencies, the condition for oscillation may be written $$\frac{1}{R}+j\omega C+\frac{1}{j\omega L}-kg_m=0$$

where R is the resonant impedance of the LC circuit (including any losses due to the tube), $g_m$ is the average tube transconductance and $k$ is the fraction of $g_m$ which is effective across the circuit (this depends on the feedback circuit). Since both real and imaginary parts of this equation must be equated separately to zero, the frequency is determined by $$\omega^2LC=1$$

and is affected by the tube only insofar as C or L are due to the tube. At a sufficiently high frequency, the electron transit time in the tube leads to a delay in its response, so that the transconductance must be replaced by a transadmittance, which is roughly of the form $$\begin{aligned}y_m&=|g_m|e^{j\omega\tau}\\&=|g_m|\cos\omega\tau+j\,|g_m|\sin\omega\tau\end{aligned}$$

where $\omega\tau$ is the phase angle, with $\tau$ representing an effective transit time. Thus the resonant frequency is now determined by $$\omega^2LC+k|g_m|\omega L\sin\omega\tau=1$$

which, for small transit angles, is approximately $\omega^2L\ (C+k|g_m|\tau)=1$. Thus the apparent capacitance can be varied by a change in the transit time. In tubes similar to the type 6A8 operating in conventional converter circuits, measurements showed that the phase angle of the oscillator transconductance was appreciable above 5 megacycles and, even more important, was markedly affected by the bias on the #4 grid. It was found that the cause of this was that electrons to the oscillator anode (#2 grid) first passed through grids 1, 2 and 3 until they were turned back at grid 4 finally reaching grid 2 again. A change in #4 grid bias shifted the point at which they were turned around and so changed their transit time.

It occurred to me that this behavior, although detrimental to normal converter operation with automatic volume control could be quite useful in providing automatic frequency control at low cost.

It also occurred to me that the idea could be applied to special oscillator tube designs and would be of particular value in the frequency range above 30 megacyles (i. e. the V.-H.-F. and U.-H.-F. ranges). It is in this range that oscillator frequency drift is so very troublesome, while at the same time, transit time effects could be put to good use.

I propose that, in place of the ordinary triode oscillator, a tube 10 be built as indicated in Figure 1. The construction of this tube is essentially similar to the tube disclosed in Figure 1 of my abandoned U. S. application, Serial No. 752,009, filed June 3, 1947, of which this application is a continuation-in-part. The tube construction shown in Figure 3 of my earlier application may also be used for the purposes of the present invention. It will be understood however that the interelectrode distances, the mechanical supporting structure and methods and the electrical insulation provided will be substantially different in tubes built for the purposes of the aforementioned application as compared to tubes built for the purposes of the present application. In the tube of the present application the electrode spacing and lead arrangements are such as to provide a good oscillator for comparatively high frequencies whereas in the previous application the generated oscillations are of much lower frequency and the tube is arranged to handle large amounts of power. In the present tube to insure oscillation generation the control grid, anode and cathode are closely spaced and there is minimum capacitance between electrodes and minimum lead inductance.

It is seen from Figure 1 that the anode 12 of the triode section of my novel tube has an aperture beyond which is placed a reflector electrode 14. My novel tube also includes a cathode 16 and control grid 18. The anode 12, control grid 18 and cathode 16 may be coupled in a regenerative oscillation generator circuit including a tuned tank circuit 20, as shown in Figure 2. Part of the electron stream may be intercepted by the anode, whereas another part passes through the aperture to be reflected and strike the anode on its outer surface. The electrons which pass through the aperture and are reflected by the negative reflector potential have a transit time which depends on the total distance traversed. When the reflector potential is changed, then the position at which the electrons are turned back is altered, so that this transit time is changed. This, in turn, alters the phase angle of the transconductance and the frequency, as explained above. By changing the size of the anode aperture, the proportion of current available for frequency change to the current flowing direct to the anode for the production of oscillations may be varied so as to meet specific requirements. The voltages and distances in the tube may also be so adjusted as to attain optimum results at a particular frequency.

In view of the behavior of the tube of the present application the reflector electrode 14 and its arrangement may be somewhat different than that of the corresponding electrode in my earlier application, Serial No. 752,009, filed June 3, 1947. This is because in the earlier application the said electrode serves as a rectifier and in the present case it serves as an electron path control electrode. Moreover in the earlier application the said electrode is placed comparatively close to the main anode aperture whereas in the present application the distance of the reflector electrode from the anode aperture is such as to allow an electron transit time of the order of one or more quarter periods of the oscillation frequency. Furthermore in the present application the reflector electrode is ordinarily by-passed, at the oscillation frequency, to the cathode or control grid and is operated at a negative D.-C. potential in order to collect no current. The electrons between the anode and reflector are therefore acted upon by a radio frequency field.

A circuit using such a tube as a local oscillator in a frequency modulation receiver is shown in Figure 2. This receiver may include an aerial A, a frequency converter or mixer stage MC including a detector excited by signals intercepted at A and by oscillations produced in tank circuit 20 and fed to the converter by coupling inductance 22. The receiver may also include an intermediate frequency amplifier IFA and a frequency discriminator and detector FDD of a conventional type including two diodes D1 and D2 coupled differentially by winding 24 to the output of the amplifier IFA and also coupled cophasally by a capacitor C, which is substantially nonresponsive to frequency changes, to the output of amplifier IFA. This apparatus operates in a well known manner, when frequency modulated signals are picked up at A, to provide across load impedances LI potentials which vary in accordance with the signals and also in accordance with slow variations of the average or center frequency of the IF output at IFA. The potentials are fed to the output lead and to a time constant circuit R*g* and C*f* wherein the variations at signal frequency and above are removed and the slow variations are fed to the electrode 14 for automatic frequency control purposes.

With the present frequency modulation band, at 100 mc., it is common practice to use a separate oscillator section and my circuit shows how a separate tube or a separate tube section of the converter tube would normally be used. Although a conventional Seeley-Foster discriminator is shown, it is understood that any other frequency modulation detector such as the Seeley ratio detector, or the Conrad type detector, will also operate in the same way. The D.-C. output of the detector is connected through the low-pass filter, consisting of resistor R*g* and capacitor C*f*, to the reflector electrode. It will also be noted that the capacitor C*f* serves as a radio frequency by-pass path between the reflector electrode and the cathode. The diodes are connected in such polarity to the discriminator transformer that, when the intermediate frequency changes, the increment of D.-C. output applied to the reflector 14 is such as to alter the oscillator frequency so as to oppose the I.-F. frequency change. The cathode resistor, RK, in the oscillator circuit is but one of the many ways in which the reflector electrode 14 may be held negative with respect to the cathode, so as not to draw electron current and load down the discriminator. Examination of the entire circuit shows that automatic frequency control has been added at very low cost, involving only two resistors and two capacitors in addition to the normal triode oscillator components.

It should be understood that the oscillator tube shown in Figure 2 may also be a 6A8 pentagrid converter, in which case the #4 grid would be used as a reflector and the #2 grid as oscillator anode. Similarly, any other tube with a structure similar to Figure 1 may be used. For example, the 6SA7 or 6BE6 pentagrid converters may be used by placing the reflector voltage on the #3 grid, and using the #2 grid in place of the anode. In none of these cases, of course, are the tubes used in the manner originally intended in their design, i. e. as converters.

Improvements on apparatus and circuits disclosed herein have been made by J. Kurshan as disclosed in his U. S. application, Serial No. 46,943, filed August 31, 1948.

I claim:

1. In apparatus for generating oscillations and for controlling the frequency of the generated oscillations, an electron discharge device having an electron-emitting electrode and an electron-reiving electrode, means connecting said electrodes in an external oscillation generating circuit, said second-named electrode having an aperture therein, an additional electrode in said device arranged to influence the path followed by electrons from said first-named electrode which pass through said aperture and return to said second-named electrode, and means for applying a control potential to said additional electrode to vary said path to correspondingly vary the device reactance and the frequency of operation of said oscillation generating circuit.

2. In apparatus for generating oscillatory energy of controllable frequency, an electron discharge device having a cathode, an electron intensity control electrode, an electron-receiving electrode and an additional electrode for controlling the path taken by at least a part of the emitted electrons in reaching said electron-receiving electrode, an external resonant circuit coupling the cathode, the control electrode and the electron-receiving electrode in a circuit for the production of oscillatory energy, and means for applying a control potential to said additional electrode to control said path to correspondingly vary the device reactance and the frequency of operation of said oscillation generating circuit.

3. In apparatus for generating oscillatory energy of controllable frequency, an electron discharge device having an electron-emitting electrode, an electron intensity control electrode and an apertured electron-receiving electrode, means connecting all of said electrodes in an external oscillation generating circuit the phase or frequency of operation of which is to be controlled and which depends on the time required for at least a part of the emitted electrons to reach said electron-receiving electrode, an additional electrode in said device, facing the aperture in said electron-receiving electrode, for controlling the path followed by electrons reaching said electron-receiving electrode after passing through said aperture, and means for applying a control potential to said additional electrode to control said path to correspondingly vary the reactance of the device and the frequency of the oscillations generated.

4. An oscillator, comprising an electron discharge device having a cathode, a control electrode surrounding the cathode, an apertured anode around the control electrode, an auxiliary electrode, external to the anode aperture, for frequency control purposes, an external oscillatory circuit connected between the anode, cathode and control electrode, a connection from the cathode to a point on said circuit intermediate the anode and control electrode connections thereto, a radio frequency bypass between the auxiliary electrode and the cathode, and means for varying the potential on the auxiliary electrode in order to vary the frequency of the oscillator.

5. An oscillator of controllable frequency, comprising an electron discharge device having a cathode, a grid, an apertured anode and an auxiliary electrode aligned with the anode aperture, an external oscillatory circuit consisting of inductance and capacitance connected between the anode and the cathode, a feedback connection from said circuit to the grid to cause self-oscillation, a radio frequency bypass path between the auxiliary electrode and the cathode, and a connection to the auxiliary electrode for varying its potential to control the oscillator frequency.

EDWARD W. HEROLD.

REFERENCES CITED

The following references are of record in the file of this patent:

UNITED STATES PATENTS

| Number | Name | Date |
|---|---|---|
| 2,061,773 | Jobst | Nov. 24, 1936 |
| 2,232,158 | Banks | Feb. 18, 1941 |
| 2,235,817 | Freeman | Mar. 25, 1941 |
| 2,244,747 | Varian | June 10, 1941 |
| 2,397,701 | Smyth | Apr. 2, 1946 |
| 2,425,657 | Tunick | Aug. 12, 1947 |
| 2,434,293 | Stearns | Jan. 13, 1948 |
| 2,442,378 | Ronci | June 1, 1948 |